(12) United States Patent
Lee et al.

(10) Patent No.: US 11,798,231 B2
(45) Date of Patent: Oct. 24, 2023

(54) METHOD FOR GENERATING HOLLOW STRUCTURE BASED ON 2D LAMINATED CROSS-SECTIONAL OUTLINE FOR 3D PRINTING

(71) Applicant: Korea Electronics Technology Institute, Seongnam-si (KR)

(72) Inventors: Hye In Lee, Anyang-si (KR); Hwa Seon Shin, Yongin-si (KR); Sung Hwan Chun, Seoul (KR); Sung Hun Park, Seoul (KR); Ji Min Jang, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 71 days.

(21) Appl. No.: 17/623,104

(22) PCT Filed: Nov. 10, 2020

(86) PCT No.: PCT/KR2020/015683
§ 371 (c)(1),
(2) Date: Dec. 27, 2021

(87) PCT Pub. No.: WO2021/107456
PCT Pub. Date: Jun. 3, 2021

(65) Prior Publication Data
US 2022/0262071 A1    Aug. 18, 2022

(30) Foreign Application Priority Data

Nov. 29, 2019  (KR) .......................... 10-2019-0156390

(51) Int. Cl.
*G06T 17/20* (2006.01)
*G06T 7/20* (2017.01)

(52) U.S. Cl.
CPC ..................................... *G06T 7/20* (2013.01)

(58) Field of Classification Search
None
See application file for complete search history.

(56) References Cited

U.S. PATENT DOCUMENTS

| | | | | |
|---|---|---|---|---|
| 2004/0095347 A1* | 5/2004 | Yamagata | ............... | G06T 17/20 345/423 |
| 2012/0059630 A1* | 3/2012 | Kubota | ................... | G06F 30/13 703/1 |

(Continued)

FOREIGN PATENT DOCUMENTS

| | | |
|---|---|---|
| JP | 2001-9920 A | 1/2001 |
| KR | 10-2015-0100064 A | 9/2015 |

OTHER PUBLICATIONS

Korean Office Action dated Dec. 24, 2020 in counterpart Korean Patent Application No. 10-2019-0156390 (3 pages in English, 5 pages in Korean).

*Primary Examiner* — Sultana M Zalalee
(74) *Attorney, Agent, or Firm* — NSIP Law

(57) ABSTRACT

Provided is a method for generating a hollow structure of a 3D model on the basis of a 2D laminated cross-sectional outline to reduce the amount of using a material or the weight of a printed matter during laminating and manufacturing. The method for generating a hollow structure based on a 2D laminated cross-sectional outline, according to an embodiment of the present invention, comprises the steps of: slicing the 3D model; generating a hollow structure outline on the basis of the result of the slicing; detecting an overhang area between adjacent hollow structure outlines; recalculating the hollow structure outline according to the result of detecting the overhang area; and generating a hollow structure mesh on the basis of the recalculated hollow structure outline. Accordingly, because 2D laminated cross-sectional data is used, a hollow structure can be generated without separate data processing, thereby reduc- (Continued)

ing a calculation burden. In addition, because the hollow structure is processed so that an overhang area is not generated when generating the hollow structure, a support is not needed therein, thereby making post-processing easy.

20 Claims, 6 Drawing Sheets

(56) References Cited

U.S. PATENT DOCUMENTS

| | | | |
|---|---|---|---|
| 2015/0066178 A1* | 3/2015 | Stava | B22F 10/47 |
| | | | 700/98 |
| 2016/0144574 A1 | 5/2016 | Eilken et al. | |
| 2018/0079138 A1* | 3/2018 | Tanaka | B29C 64/386 |
| 2018/0154437 A1* | 6/2018 | Mark | B22F 1/10 |
| 2018/0289493 A1* | 10/2018 | Mansmann | A61F 2/3859 |
| 2018/0373227 A1* | 12/2018 | Sadusk | H04N 1/00676 |
| 2020/0004225 A1* | 1/2020 | Buller | B29C 64/393 |

\* cited by examiner

METHOD FOR GENERATING HOLLOW STRUCTURE BASED ON 2D LAMINATED CROSS-SECTIONAL OUTLINE FOR 3D PRINTING

CROSS REFERENCE TO RELATED APPLICATIONS

This application is a U.S. National Stage Application of International Application No. PCT/KR2020/015683, filed on Nov. 10, 2020, which claims the benefit under 35 USC 119(a) and 365(b) of Korean Patent Application No. 10-2019-0156390, filed Nov. 29, 2019, in the Korean Intellectual Property Office, the entire disclosure of which is incorporated herein by reference for all purposes.

TECHNICAL FIELD

The present disclosure relates to a method for hollowing out and printing a 3D input model in order to reduce a quantity of using materials or a weight of a printed object when additive manufacturing is performed, and more particularly, to a method for generating a hollow structure of a 3D model based on a 2D laminated cross-sectional outline in order to reduce a quantity of using materials or a weight of a printed object when additive manufacturing is performed.

BACKGROUND ART

As shown in FIG. 1, a related-art additive manufacturing method may print a hollowed-out structure (hollow structure) by hollowing out a 3D input model in order to reduce a quantity of using materials or a weight of a printed object.

Such an existing hollow structure is made by using voxel data or through offset (extension, reduction) calculation of 3D mesh vertexes, and the hollow structure made in this way has a problem that an overhang area requiring a support is generated.

In addition, the support is a separate support for supporting a printed area when additive manufacturing is performed, and has a problem that it is difficult to remove the support at a post-processing step when the support is generated inside a model.

DISCLOSURE

Technical Problem

The present disclosure has been developed in order to address the above-discussed deficiencies of the prior art, and an object of the present disclosure is to provide a method for generating a hollow structure for reducing a quantity of using materials and a weight of a printed object, based on a 2D laminated cross-sectional outline, which prevents an overhang area requiring a support from being generated in the hollow structure when additive manufacturing is performed.

Technical Solution

According to an embodiment of the present disclosure to achieve the above-described object, a method for generating a hollow structure based on a 2D laminated cross-sectional outline includes the steps of: slicing a 3D model; generating a hollow structure outline based on a result of the slicing; detecting an overhang area between adjacent hollow structure outlines; recalculating a hollow structure outline according to a result of detecting the overhang area; and generating a hollow structure mesh based on the recalculated hollow structure outline.

The step of slicing may include generating a 2D cross-sectional outline by slicing the 3D model into layer-thick pieces in a z-axis direction.

The step of generating the hollow structure outline may include generating the hollow structure outline through offset calculation by reducing the 2D laminated cross-sectional outline, which is generated as the result of the slicing, inwards by a set value.

The step of detecting the overhang area may include detecting the overhang area on each layer from an uppermost layer of the hollow structure outline, based on a difference between hollow structure outlines of adjacent laminated surfaces.

At the step of detecting the overhang area, an area that is calculated as an overhang area on an upper layer may be accumulated on a lower layer as an overhang area.

The step of recalculating the hollow structure outline may include recalculating the hollow structure outline not to generate an overhang area.

The step of recalculating the hollow structure outline may include recalculating the hollow structure outline through offset calculation, by considering the area that is calculated as the overhang area on each layer from the uppermost layer.

The step of recalculating the hollow structure outline may include recalculating the hollow structure outline of each layer as an outline which extends an overhang area of an adjacent upper layer outwards as much as a minimum area.

The step of generating the hollow structure mesh may include generating 3D mesh data by connecting vertexes forming the recalculated hollow structure outline.

According to another embodiment of the present disclosure, a computer-readable recording medium has a computer program recorded thereon to perform a method for generating a hollow structure based on a 2D laminated cross-sectional outline, the method including the steps of: slicing a 3D model; generating a hollow structure outline based on a result of the slicing; detecting an overhang area between adjacent hollow structure outlines; recalculating a hollow structure outline according to a result of detecting the overhang area; and generating a hollow structure mesh based on the recalculated hollow structure outline.

According to still another embodiment of the present disclosure, a method for generating a hollow structure based on a 2D laminated cross-sectional outline includes the steps of: generating a hollow structure outline based on a result of slicing a 3D model; detecting an overhang area between adjacent hollow structure outlines, and recalculating a hollow structure outline not to generate an overhang area; and generating a hollow structure mesh based on the recalculated hollow structure outline.

According to yet another embodiment of the present disclosure, a computer-readable recording medium has a computer program recorded thereon to perform a method for generating a hollow structure based on a 2D laminated cross-sectional outline, the method including the steps of: generating a hollow structure outline based on a result of slicing a 3D model; detecting an overhang area between adjacent hollow structure outlines, and recalculating a hollow structure outline not to generate an overhang area; and generating a hollow structure mesh based on the recalculated hollow structure outline.

Advantageous Effects

According to embodiments of the present disclosure as described above, 2D laminated cross-sectional data is used and a hollow structure is generated without separate data processing, so that a calculation burden can be reduced.

According to various embodiments of the present disclosure, a hollow structure is generated not to generate an overhang area, and a support is not required, and accordingly, post-processing can be easily performed.

BEST MODE

Hereinafter, the present disclosure will be described in more detail with reference to the drawings.

Figure 1:
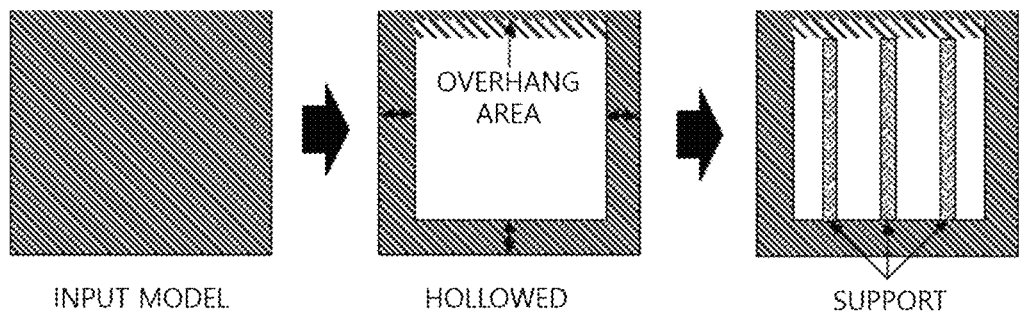
FIG. 1 is a view provided to explain a related-art method for generating a hollowed-out structure (hollow structure)
Figure 2:
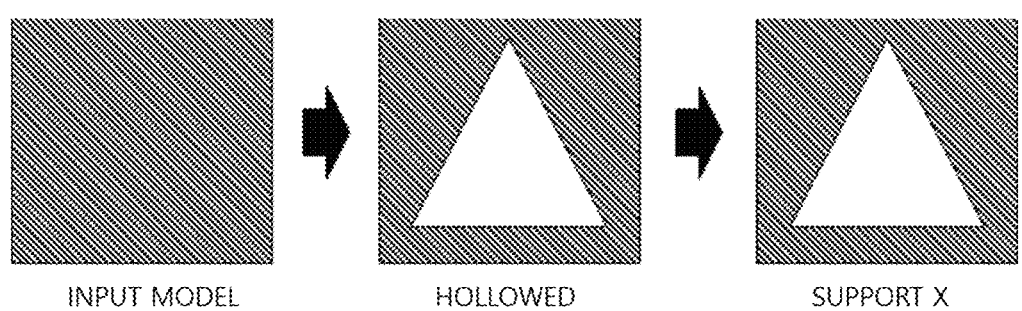
FIG. 2 is a view provided to explain a concept of a hollow structure without generating an overhang area according to an embodiment of the present disclosure.
Figure 3:
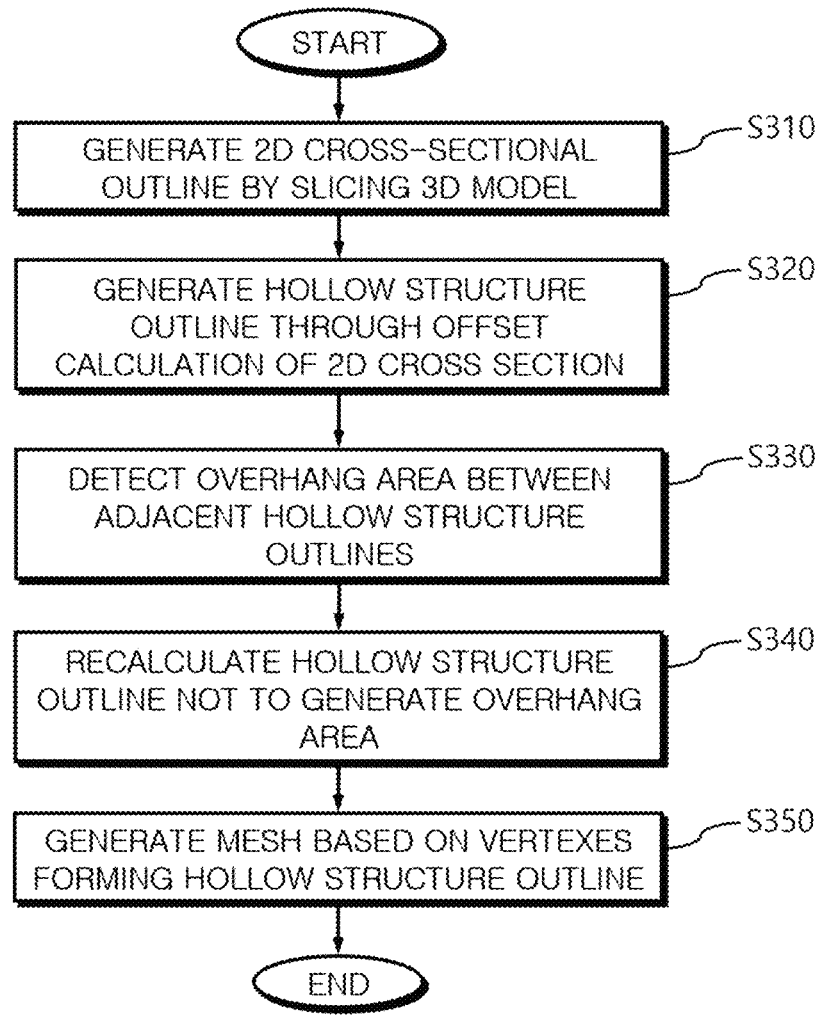
FIG. 3 is a view provided to explain a method for generating a hollow structure based on a 2D laminated cross-sectional outline according to an embodiment of the present disclosure.
Figure 4:
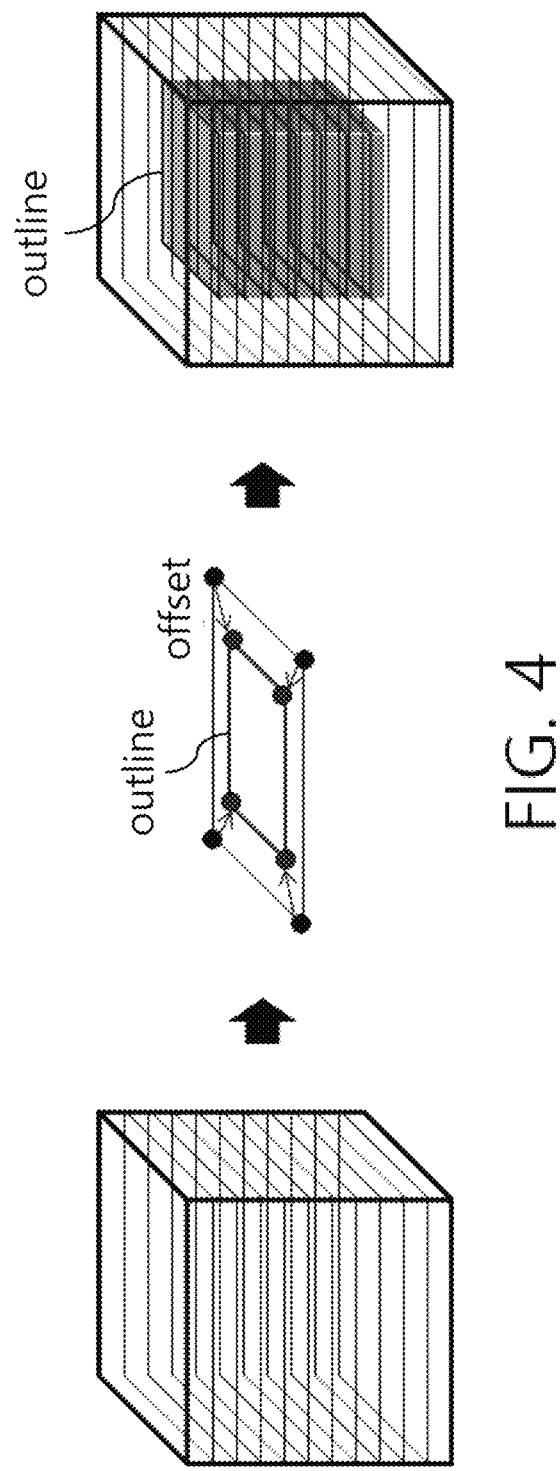
FIG. 4 is a view provided to explain a step of generating a hollow structure outline according to an embodiment of the present disclosure.
Figure 5:
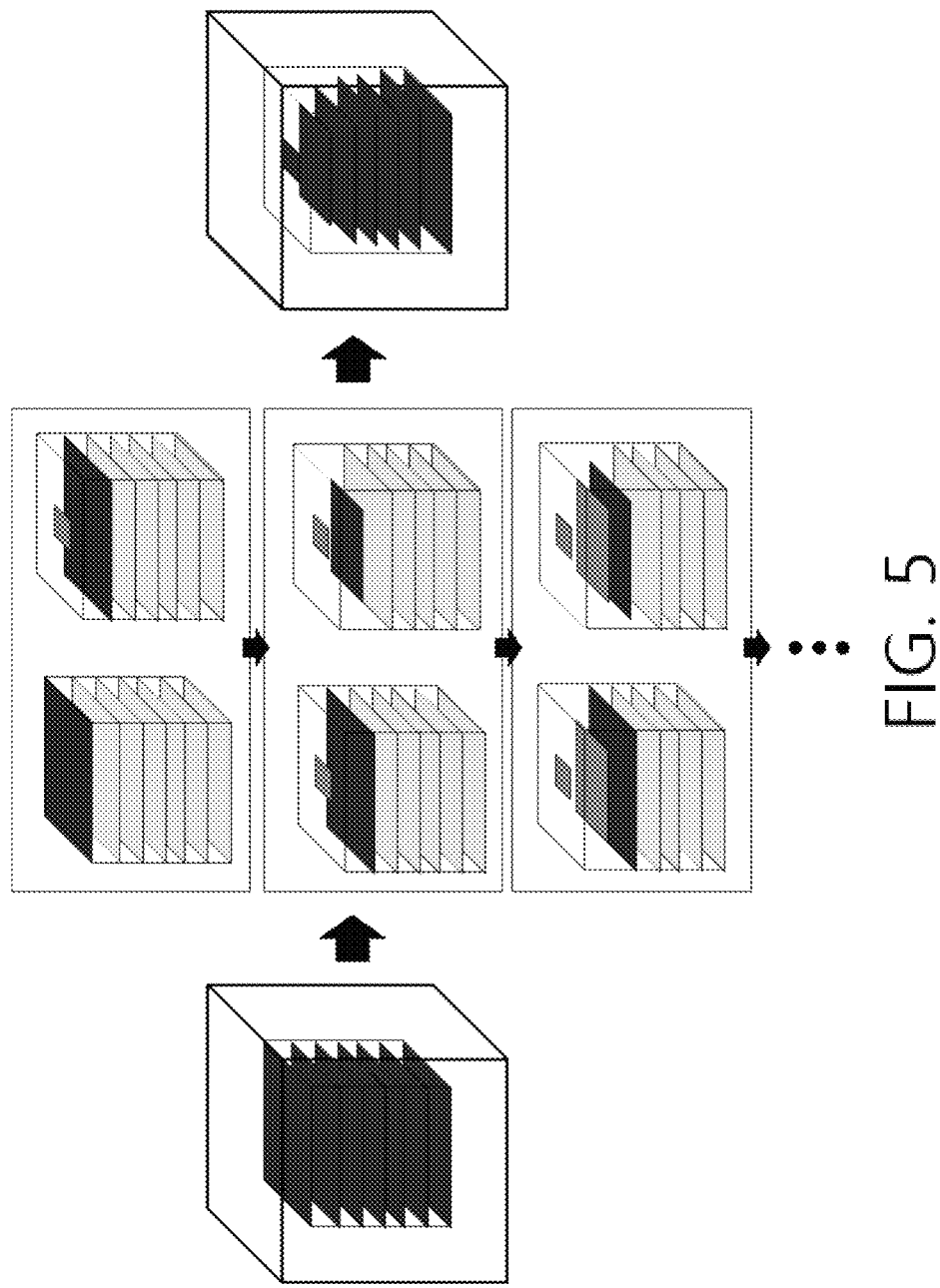
FIG. 5 is a view provided to explain a step of recalculating a hollow structure outline according to an embodiment of the present disclosure.
Figure 6:
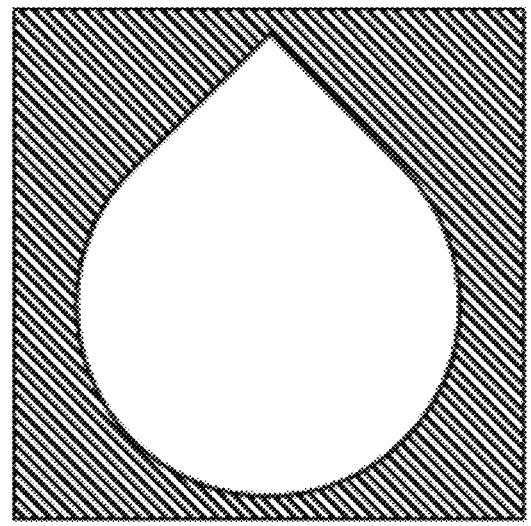
FIGS. 6 to 9 are views illustrating examples of hollow structures of various types in which an overhang is not generated according to an embodiment of the present disclosure.
Figure 7:
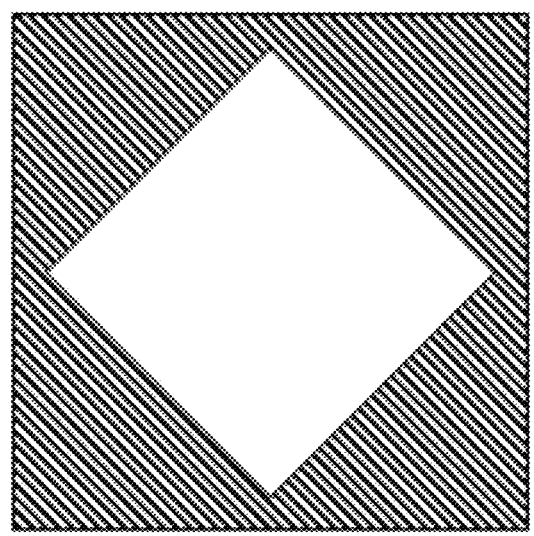
Figure 8:
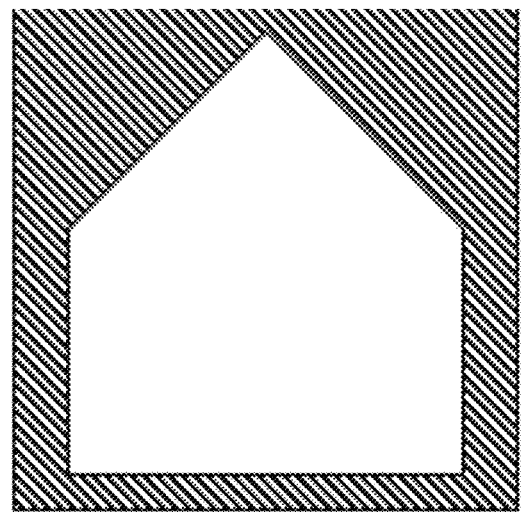
Figure 9:
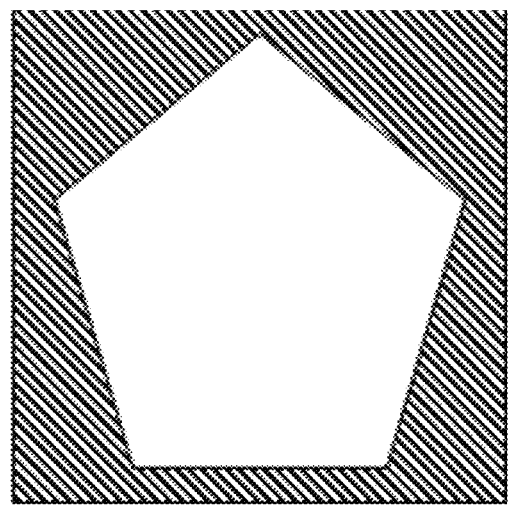

FIG. 2 is a view provided to explain a concept of a hollow structure without generating an overhang area according to an embodiment of the present disclosure, and FIG. 3 is a view provided to explain a method for generating a hollow structure based on a 2D laminated cross-sectional outline according to an embodiment of the present disclosure. In addition, FIG. 4 is a view provided to explain a step of generating a hollow structure outline according to an embodiment of the present disclosure, and FIG. 5 is a view provided to explain a step of recalculating a hollow structure outline according to an embodiment of the present disclosure.

In a process of receiving an input of 3D mesh data and generating an output code and 3D mesh data including a hollow structure for reducing a quantity of using materials and a weight of a printed object, the method for generating the hollow structure based on the 2D laminated cross-sectional outline according to the present embodiment prevents an overhang area requiring a support from being generated in the hollow structure as shown in FIG. 2. Since a support is not required inside, post-processing can be easily performed, and, since 2D laminated cross-sectional data is used, the hollow structure can be generated without separate data processing, and accordingly, a calculation burden can be reduced.

To achieve this, the method for generating the hollow structure based on the 2D laminated cross-sectional outline may include: a slicing step (S310) of slicing a 3D model; a hollow structure outline generation step (S320) of generating a hollow structure outline based on the result of slicing; a hollow structure overhang area detection step (S330) of detecting an overhang area between adjacent hollow structure outlines; a hollow structure outline recalculation step (S340) of recalculating a hollow structure outline according to the result of detecting the overhang area; and a hollow structure mesh generation step (S350) of generating a hollow structure mesh based on the recalculated hollow structure outline.

At the slicing step, the 3D model may be sliced in a z-axis direction into layer-thick pieces to generate a 2D laminated cross section, and a 2D cross-sectional outline may be generated.

At the hollow structure outline generation step, a hollow structure outline may be generated in the model through offset calculation by reducing the 2D laminated cross-sectional outline, which is generated as the result of slicing, inwards by a set value.

At the overhang area detection step, an overhang area may be detected on each layer from the uppermost layer of the hollow structure outline, based on a difference between hollow structure outlines of adjacent laminated surfaces. In this case, an area that is calculated as an overhang area on an upper layer is accumulated on a lower layer as an overhang area.

At the hollow structure outline recalculation step, a hollow structure outline may be recalculated so that an overhang area is not generated.

Specifically, at the hollow structure outline recalculation step, a hollow structure outline may be recalculated through offset calculation by considering the area that is calculated as an overhang area on each layer from the uppermost layer, as shown in FIG. 5.

In this case, the uppermost layer that has no hollow structure outline on the upper layer thereof among the outlines calculated as hollow structure outlines may be set as a minimum area that can be printed without a support, and this minimum area may be changed according to a 3D printing method.

Herein, the uppermost layer is not the uppermost layer of laminated surfaces of the 3D input model, but the uppermost layer that does not have a hollow structure outline on the upper layer thereof from among the outlines calculated as hollow structure outlines.

For example, the hollow structure outline of each layer may be recalculated as an outline that extends an overhang area of an adjacent upper layer to the outside as long as the minimum area, but, as shown in FIGS. 6 to 9, the hollow structure outline may be recalculated in various hollow structure shapes without generating an overhang area according to a variable offset set value or a shape of an input model.

At the hollow structure mesh generation step, 3D mesh data may be generated by connecting vertexes forming the recalculated hollow structure outline. The generated 3D mesh data may be used to render the hollow structure to be seen on a 3D graphic screen. The last step of generating the mesh is to render and visualize the structure with the 3D mesh, and may be omitted if it is unnecessary.

In addition, the method for generating the hollow structure based on the 2D laminated cross-sectional outline does not require separate slicing to make an output code including a hollow structure. Since hollow structure outline information is calculated on every laminated surface, printing is possible simply by recalculating only the output code including the outline.

Since slicing in an additive manufacturing preparation process has a large calculation burden if a mesh resolution of an input model is high, the suggested method has high efficiency in view of an amount of calculation compared to related-art methods.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A method for generating a hollow structure based on a 2D laminated cross-sectional outline, the method comprising the steps of:
   slicing a 3D model;
   generating a hollow structure outline based on a result of the slicing;
   detecting an overhang area between adjacent hollow structure outlines;
   recalculating a hollow structure outline according to a result of detecting the overhang area; and
   generating a hollow structure mesh inside the 3D model based on the recalculated hollow structure outline.

2. The method of claim 1, wherein the slicing comprises generating the 2D cross-sectional outline by slicing the 3D model into layer-thick pieces in a z-axis direction.

3. The method of claim 2, wherein the generating the hollow structure outline comprises generating the hollow structure outline through offset calculation by reducing the 2D laminated cross-sectional outline, which is generated as the result of the slicing, inwards by a set value.

4. The method of claim 3, wherein the detecting the overhang area comprises detecting the overhang area on each layer from an uppermost layer of the hollow structure outline, based on a difference between hollow structure outlines of adjacent laminated surfaces.

5. The method of claim 4, wherein, at the detecting the overhang area, an area that is calculated as an overhang area on an upper layer is accumulated on a lower layer as an overhang area.

6. The method of claim 4, wherein the recalculating the hollow structure outline comprises recalculating the hollow structure outline not to generate an overhang area.

7. The method of claim 6, wherein the recalculating the hollow structure outline comprises recalculating the hollow structure outline through offset calculation, by considering the area that is calculated as the overhang area on each layer from the uppermost layer.

8. The method of claim 7, wherein the recalculating the hollow structure outline comprises recalculating the hollow structure outline of each layer as an outline which extends an overhang area of an adjacent upper layer outwards as much as a minimum area.

9. The method of claim 7, wherein the generating the hollow structure mesh comprises generating 3D mesh data by connecting vertexes forming the recalculated hollow structure outline.

10. A non-transitory computer-readable storage medium storing instructions that, when executed by one or more processors, cause the one or more processors to perform a method for generating a hollow structure based on a 2D laminated cross-sectional outline, the method comprising the steps of:
    slicing a 3D model;
    generating a hollow structure outline based on a result of the slicing;
    detecting an overhang area between adjacent hollow structure outlines;
    recalculating a hollow structure outline according to a result of detecting the overhang area; and
    generating a hollow structure mesh formed inside the 3D model based on the recalculated hollow structure outline.

11. A method for generating a hollow structure based on a 2D laminated cross-sectional outline, the method comprising:
    generating a hollow structure outline based on a result of slicing a 3D model;
    detecting an overhang area between adjacent hollow structure outlines, and recalculating a hollow structure outline not to generate an overhang area; and
    generating a hollow structure mesh inside the 3D model based on the recalculated hollow structure outline.

12. An electronic device, the device comprising:
    one or more processors configured to:
    generate a hollow structure outline based on a result of slicing a 3D model;
    detect an overhang area between adjacent hollow structure outlines, and recalculate a hollow structure outline not to generate an overhang area; and
    generate a hollow structure mesh inside the 3D model based on the recalculated hollow structure outline.

13. The device of claim 12, wherein, for the slicing, the one or more processors are configured to generate the 2D cross-sectional outline by slicing the 3D model into layer-thick pieces in a z-axis direction.

14. The device of claim 13, wherein, for the generating the hollow structure outline, the one or more processors are configured to generate the hollow structure outline through offset calculation by reducing the 2D laminated cross-sectional outline, which is generated as the result of the slicing, inwards by a set value.

15. The device of claim 14, wherein, for the detecting the overhang area, the one or more processors are configured to detect the overhang area on each layer from an uppermost layer of the hollow structure outline, based on a difference between hollow structure outlines of adjacent laminated surfaces.

16. The device of claim 15, wherein, at the detecting the overhang area, an area that is calculated as an overhang area on an upper layer is accumulated on a lower layer as an overhang area.

17. The device of claim 15, wherein, for the recalculating the hollow structure outline, the one or more processors are configured to recalculate the hollow structure outline not to generate an overhang area.

18. The device of claim 17, wherein, for the recalculating the hollow structure outline, the one or more processors are configured to recalculate the hollow structure outline through offset calculation, by considering the area that is calculated as the overhang area on each layer from the uppermost layer.

19. The device of claim 18, wherein, for the recalculating the hollow structure outline, the one or more processors are configured to recalculate the hollow structure outline of each layer as an outline which extends an overhang area of an adjacent upper layer outwards as much as a minimum area.

20. The device of claim 18, wherein, for the generating the hollow structure mesh, the one or more processors are configured to generate 3D mesh data by connecting vertexes forming the recalculated hollow structure outline.

\* \* \* \* \*